United States Patent Office 3,417,090
Patented Dec. 17, 1968

---

3,417,090
REDUCTION OF NITRO COMPOUNDS TO AMINES
Heinrich Pelster, Leverkusen, Claus Konig, Leverkusen-Schlebusch, and Rolf Putter, Dusseldorf, Germany, assignors to Farbenfabriken Bayer Aktiengesellschaft, Leverkusen, Germany, a corporation of Germany
No Drawing. Continuation-in-part of application Ser. No. 470,211, July 7, 1965. This application Sept. 15, 1965, Ser. No. 487,574
10 Claims. (Cl. 260—288)

ABSTRACT OF THE DISCLOSURE

Organic nitro compounds are reduced to the corresponding primary amino compounds with sulphur dioxide in a sulphuric acid medium in the presence of a catalyst, preferably hydriodic acid or a compound which forms hydriodic acid under the reaction conditions.

---

This invention relates to a process for the production of primary amino compounds by the reduction of the corresponding nitro compounds. This application is a continuation-in-part of Ser. No. 470,211, filed July 7, 1965.

It is known to reduce organic nitro compounds with iron or with catalytically active hydrogen. The classic example of this is the reduction of nitrobenzene to aniline. Other reducing agents have also been proposed for this process, for example, sodium hydrogen sulphide or a mixture of zinc and hydrochloric acid.

Furthermore, it is known to react aromatic nitro compounds in a weakly acid medium (pH 6 to 6.5) with sodium hydrogen sulphite. With this reaction, which is known as the "Piria reaction," sulphonic acid groups are generally introduced in addition to the nitro group being reduced to an amino group. For example, by reacting 1-nitro-naphthalene and sodium hydrogen sulphite there is produced mainly 1-amino-naphthalene-2,4-disulphonic acid together with lesser amounts of 1-aminonaphthalene-2-sulphonic acid and only about 2% of 1-aminonaphthalene (Houben-Weyl, vol. 11/1, page 457).

A characteristic feature of the "Piria reaction" is that initially it proceeds very quickly, then becomes slower and finally comes to a stop when the reaction mixture is so acid that there are no hydrogen sulphite ions present, but only dissociated sulphurous acid and sulphur dioxide. Thus, the "Piria reaction" cannot be carried out in mineral acid solutions.

The technical processes discussed above also present disadvantages. Thus, when the reduction is effected with iron, it is, for example, a difficult operation to separate out the iron oxide sludge which forms in large quantities. Catalytic hydrogenation is only possible in special installations which have to be protected against explosion, since working is effected with hydrogen. Furthermore, with this reaction, as with the iron reduction, considerable difficulties arise when working in a strongly acid medium. In such cases, rearrangement reactions and resinification of the reaction products are predominant.

In the technical sphere, the nitro compounds resulting from the common process of nitration with concentrated nitric and sulfuric acid or sulfonated nitro compounds produced by sulphonation with sulfuric acid are obtained in sulphuric acid solution so that, prior to the reduction, either the nitro compound has to be isolated or the sulphuric acid has to be removed as calcium sulphate. The latter working step is particularly necessary in connection with nitro sulphonic acids, e.g. of the benzene and naphthalene series, since it is difficult for these to be isolated in any other way.

A process for the production of primary amino compounds by reduction of nitro compounds has now been found which does not involve the disadvantages set forth above.

The present invention provides a process for the production of primary amino compounds, which comprises reducing the corresponding nitro compound in a sulphuric acid medium with sulphur dioxide. Sulphur dioxide per se may be used or a solution of sulphur dioxide or a neutral or acid salt of sulphurous acid can be employed. The reduction is conducted in the presence of a catalyst and at temperatures between $+30$ and $+250°$ C. The amino compound which forms from the reaction mixture is separated. The process is preferably carried out at temperatures from $+80$ to $+180°$ C. By this process, it is possible to produce the amines economically, even in a very strong sulphuric acid medium. The nitro compounds formed in the concentrated sulphuric acid can be reduced directly after suitable dilution with water without the necessity to isolate them from the nitrating reaction mixture. The process according to the invention is especially suitable for the reduction of aromatic nitrosulphonic acids, since in this case the sulphuric acid does not have to be removed from the preliminary reaction mixture. It is of course also possible to start from isolated nitro compounds, sulphuric acid being formed immediately because of the sulphur dioxide introduced from the reduction. The nitro compounds can be present in dissolved form in the aqueous sulphuric acid phase, or in the form of a dispersion. Furthermore, if the compound to be reduced contains nitro groups, the process of the invention also permits the selective reduction of a nitro group by suitably reducing the quantity of sulphur dioxide.

The sulfuric acid medium in which the reduction is carried out has a sulfuric acid concentration of from about 0.5 to about 70% by weight, preferably 15 to 40 percent by weight, thus maintaining a pH-value of less than 3 during the reaction. The sulfuric acid medium contains at least 10% water and preferably from about 30 to about 80% water. The preferred sulfuric acid medium consists essentially of an aqueous sulfuric acid having an acid concentration of from 0.5 to 70% by weight, preferably 15 to 40% by weight.

Any organic nitro compound containing at least one nitro group can be reduced to the corresponding primary amine according to the present invention. Aliphatic, heterocyclic or aromatic nitro compounds can all be used as starting materials. The terms aliphatic, heterocyclic and aromatic comprise saturated and unsaturated aliphatic radicals having 1 to 20 carbon atoms, 5- or 6-membered cycloaliphatic radicals, 6-membered heterocyclic radicals with preferably one nitrogen atom in the hetero ring to which a further benzene ring system may be condensed and especially aromatic ring systems, preferably benzene, naphthalene and anthracene. The aromatic, araliphatic, heterocyclic or aliphatic radical of these nitrogen compounds may optionally be substituted by one or more atoms or groups, for example by chlorine, bromine or iodine atoms, hydroxyl, COOH, alkoxy having 1 to 3 carbon atoms such as methoxy, ethoxy and isopropoxy, sulphonic acid, mercapto, alkyl mercapto having 1 to 3 carbon atoms, amino as well as mono- and dialkyl amino groups the alkyl radicals of which have from 1 to 3 carbon atoms, sulphonamido as well as mono- and dialkylsulphonamido the alkyl of which have 1 to 3 carbon atoms, alkyl having 1 to 10 carbon atoms, aryl (preferably phenyl and naphthyl) or aralkyl groups (preferably phenyl and naphthyl) the alkyl groups having from 1 to 3 carbon atoms.

The following are mentioned as examples of suitable starting materials:

nitromethane,
nitro-propane,
1-nitrooctane,
1-nitrooctadecane,
1-nitro-6-chlorohexane,
1-nitroethane-2-sulphonic acid,
1-nitro-4-n-hexyl-2-sulphonic acid,
nitroacetic acid,
nitrocyclohexane,
2-chloro-4-nitrocyclohexane,
4-methyl-1-nitrocyclohexane,
4-isoocytyl-1-nitrocyclohexane, nitropyridines, nitroquinolines such as 1,5-dinitroquinoline, 1,8-dinitroquinoline. Especially suitable are aromatic nitro compounds, for example nitrobenzene,
2-nitrochlorobenzene,
2-, 3- and 4-nitrophenols,
2-, 3- and 4-nitrobenzene-sulphonic acids,
1-nitrobenzene-3,5-disulphonic acid,
1-nitrobenzene-2-, 3- or 4-carboxylic acids,
nitrotoluene,
2-nitrotoluosulphonic acid,
2-, 3- or 4-nitroaniline,
2-nitrobrombenzene,
2-nitroiodolbenzene,
1-nitro-4-methylmercaptobenzene,
1-nitro-4-mercaptobenzene,
2-nitro-4-isopropylmercaptobenzene,
4-nitroanisol,
2-nitroanisol-4-sulphonic acid,
1-nitro-4-isopropoxybenzene,
2-nitro-1-N-methylaminobenzene,
4-nitro-1-N,N-diethylaminobenzene,
1-amino-4-nitrobenzene-2-sulphonic acid,
1-amino-2-chloro-4-nitro-benzene-2-sulphonic acid,
1-amino-2-bromo-4-nitro-benzene-2-sulphonic acid,
4-sulphonamido-2-nitrophenol-1-,
4-N,N-dimethylsulphonamido-2-nitrophenol,
1-methylmercapto-2-nitro-4-sulphonamidobenzene,
4-nitrodiphenyl,
4-nitrodiphenyl-4'-sulphonic acid,
4,4'-dinitrostilbene-2,2'-disulphonic acid,
4-nitro-diphenylmethane,
4,4'-dinitro-diphenylmethane,
4,4'-dinitro-diphenylmethane-2-sulphonic acid,
4-nitro-diphenylethane,
2-nitrophenol-4-sulphonic acid,
6-chloro-2-nitrophenol-4-sulphonic acid,
2,6-dinitrophenol-4-sulphonic acid,
4-nitrocinnamic acid,
4-chloro-2-nitrophenol-6-sulphonic acid,
1-nitronaphthalene,
1,5-dinitronaphthalene and
1,8-dinitronaphthalene,
1-nitronaphthalene-5-sulphonic acid,
1-nitronaphthalene-6-sulphonic acid,
1-nitronaphthalene-7-sulphonic acid or
1-nitronaphthalene-8-sulphonic acid,
2-nitronaphthalene-4,8-disulphonic acid,
1-nitronaphthalene-3,6,8-trisulphonic acid,
1-nitronaphthalene-3,6-disulphonic acid,
1-nitronaphthalene-3,7-disulphonic acid,
1,8-dinitronaphthalene-3,6-disulphonic acid,
6-nitro-2-naphthol-1,4-disulphonic acid,
1-nitronaphthalene-3,8-disulphonic acid and
1-nitronaphthalene-4,6,8-trisulphonic acid,
1-chloro-8-nitronaphthalene,
1-bromo-8-nitronaphthalene,
2-(2'-, 4'-dinitrophenoxy)-naphthalene-6-sulphonic acid,
6-nitro-2-ethoxynaphthalene-1,4-disulphonic acid,
4-nitronaphthalic acid,
4-nitronaphthylamine-(1),
1-nitro-6-sulphonamidonaphthalene,
1-chloro-8-nitronaphthalene-4-sulphonic acid,
1-nitro-4-methylmercaptonaphthalene as well as dinitro compounds, such as 2,4-dinitrophenol,
2,4-dinitro-6-chlorophenol or
2,6-dinitro-4-chlorophenol, which can be reduced to monoamino-mono-nitro compounds or to the diamines, depending on the quantity of $SO_2$ which is used.

As the reducing agent, it is for example possible to employ pure sulphur dioxide in liquid or gaseous form, solutions thereof in water or in other solvents, industrial waste gases which contain sulphur dioxide, or neutral or acid salts of sulphurous acid. Suitable acid or neutral salts of sulphurous acid include the alkali metal salts (preferably Li, Na, K), alkaline earth metal salts (preferably Mg, Ca, Sr, Ba) as well as the ammonium salts (preferably $NH_4$).

In order to avoid losses of sulphur dioxide, it is expedient for the reaction to be carried out in a closed system, possibly under superatmospheric pressure.

The process according to the invention is conducted in the presence of a catalyst.

For the producing short reaction times, preferably hydriodic acid or those substances which form hydriodic acid under the reaction conditions are used as catalysts. The following are illustrative of catalysts which can be used for this purpose: hydriodic acid (hydrogen iodide), iodine, metal iodides such as sodium iodide, potassium iodide, lead iodide, copper iodide, and non-metal iodides, such as phosphorus iodide. Additional examples of metal and non-metal iodides include metal iodides such as lithium-, magnesium-, calcium-, strontium-, barium-, zinc-, cadmium-, mercury-, aluminum-, titanium-, tin-, silver-, iron-, cobalt-, nickel- and furthermore, non-metal iodides such as ammonium iodide as well as iodides of quaternary ammonium bases, as for instance, tetramethyl ammonium iodide, tetraethyl ammonium iodide, tetrapropyl ammonium iodide, tetrabutyl ammonium iodide, trimethylbenzyl ammonium iodide, etc. It is expedient to use 0.0001 to 0.1 mol of hydriodic acid per mol of nitro compound or an amount of catalyst which forms hydriodic acid sufficient to produce from 0.0001 to 0.1 mol of hydriodic acid per mol of nitro compound.

In one advantageous form of the reaction, the nitro compound which is in aqueous solution, or aqueous sulphuric acid or aqueous organic solution or suspension, and hydriodic acid (or compounds capable of forming hydriodic acid) as catalyst are heated in a closed system up to the reaction temperature. Sulphur dioxide is then pumped in and, if desired, also an additional quantity of hydriodic acid (or the compounds capable of forming hydriodic acid) as catalyst is added.

For carrying out the reaction, 3 to 10 mols, and advantageously 3 to 4 mols of sulphur dioxide are preferably introduced per mol of nitro group.

Additionally certain metals or metal alloys and/or metal salts can be used as catalysts. Such metals are metals of IVth period and the 1st, 2nd, 4th, 5th, 6th and 8th groups of the Mendeleef Periodic System of the elements, or alloys of these metals.

Particularly to be mentioned as metals are: silver, mercury, gold, copper, palladium, platinum and chromium; as alloys, there are preferably used manganin, constantan, nickel silver or stainless steel alloys, such as V₂A, V₄A or V₁₄A steels.

Preferable metal salts, are metals of the IVth period and 1st, 2nd, 4th, 5th, 6th and 8th groups of the Mandeleef Periodic System of the elements, for example, iron, copper, tin, titanium, vanadium, chromium or mercury salts and advantageously sulphates and chlorides thereof.

The following catalysts and catalyst combinations are for example particularly mentioned: copper, manganin, constantan, nickel silver and palladium/iron sulphate, palladium/copper sulphate, palladium/stannous chloride, iron sulphate, copper sulphate, copper/manganese sulphate, palladium/titanium trichloride, palladium/sodium vanadate, palladium/chromium sulphate, manganin (Cu-Mn-Ni)/iron sulphate, constantan (Cu-Ni)/iron sulphate and nickel silver (Cu-Ni-Zn)/iron sulphate, silver/iron sulphate, gold/iron sulphate and platinum/iron sulphate. In addition, refined steel alloys containing large proportions of chromium, copper, manganese, molybdenum, nickel, silicon, titanium, vanadium or tungsten, as for example V₂A, V₄A or V₁₄A steels, are catalytically effective particularly in conjunction with iron sulphate, copper sulphate or tin chloride.

The metals or metal salts are introduced into the reaction in quantities of 0.0001 to 0.2 mol, advantageously 0.01 to 0.03 mol per mol of nitro group.

When using metals or metal salts as catalysts in one advantageous form of the reaction, the nitro compound present in aqueous solution or aqueous sulphoric acid or aqueous organic solution or suspension and the metal used as the catalyst are heated in a closed system up to the reaction temperature. Sulphur dioxide is pumped in and optionally also an additional quantity of metal salt solution required as catalyst is added.

It is sometimes also advantageous for the aforesaid metals, alloys of these metals and/or metal salt catalysts to be used in combination with the hydrogen iodide or hydrogen iodide forming compounds already mentioned. Particularly suitable are the systems: HI/FeSO₄, HI/SnCl₂, HI/CuSO₄, HI/Cu, HI/TiCl₃, HI/CrCl₃, HI/V₄A and HI/Platinum. These systems can also be used in the form of iodides of the metal salts mentioned above.

It is often desirable to add the sulphur dioxide in small proportions. The isolation of the amino compounds which form is effected in known manner, for example, in the form of their salts.

The primary amino compounds produced according to the invention are well known compounds per se and can be used, for example, as chemical intermediates in the production of dyestuffs, surface active agents, etc.

The following examples illustrate the invention:

Example 1.—1-aminonaphthalene-3,6,8-trisulphonic acid

In a 160-litre enamelled stirrer-type autoclave, 7.44 kg. of 50% NaOH and 70 g. of 57% hydriodic acid were added to 115 kg. of a nitrating mixture (3.72 kg. of nitrite containing 35% of titratable sulphuric acid=2.8 kg. of nitrit 1-nitronaphthalene-3,6,8-trisulphonic acid and 0.92 kg. of nitrite of other isomers) and heating to 115–120° C. took place. While maintaining the indicated temperature, 10.35 kg. of SO₂ were pumped in in such a way that the internal pressure in the vessel did not rise above 10 atm. gauge. When all the SO₂ had been pumped in, stirring was carried out until the pressure was constant. The reaction was completed after 6 to 7 hours. After cooling to 32–35° C. the precipitated crystallisate was suction filtered off and washed with saturated Na₂SO₄ solution.

Yield: 32 kg. of moist 1-aminonaphthalene-3,6,8-trisulphonic acid.

Content determination: 8.2 g. of nitrite/100 g. of moist substance=2.62 kg. of total nitrite=93.5% of the theoretical of 1-aminonaphthalene-3,6,8-trisulphonic acid, calculated on the introduced 1-nitronaphthalene-3,6,8-trisulphonic acid.

The substance obtained was homogeneous when examined by chromatography.

Comment: By the designation of "g. of nitrite/100 g.," as used herein, there is to be understood the quantity in ions of sodium nitrite which is necessary to diazotise 100 g. of the amino compound and 100 g. of the nitro compound after reduction. The quantity which is used by 69 g. of sodium nitrite thus corresponds to 1 mol.

Example 2.—3-aminobenzene sulphonic acid 196 g. of sodium-nitrobenzene-3-sulphonate (60 g. of nitrite), dissolved in 1500 ml. of 15% H₂SO₄, were heated in a 3-litre enamelled shaker-type autoclave to 160° C. and SO₂ was pumped in until the pressure of 10 atm. gauge was reached. 3.2 ml. of 57% hydriodic acid in 10 cc. of H₂O were thereafter pumped in and also more SO₂, while maintaining the pressure of 10 atm. gauge. A total of 384 g. (282 cc.) of SO₂ was pumped in. The autoclave was then shaken until the pressure was constant and, after completing the reaction and extracting the excess SO₂ by boiling, the substance was suction-filtered at 25° C. The crystallisate was washed with saturated common salt solution.

Yield: 222 g. (44.5 g. of nitrite) of light grey crystals, amounting to 74% of the theoretical of 3-aminobenzene sulphonic acid.

The substance was homogeneous when examined by chromatography.

Another 10.25 g. of ntrit of 3-aminobenzene sulphonic acid (17% of the theoretical) could be obtained by salting out.

Example 3

185 g. of ammonium-1-nitronaphthalene-6-sulphonate (87.4%=41 g. of nitrite) and 1 g. of iodine, dissolved in 700 ml. of 15% H₂SO₄ were heated in a 2-litre enamelled shake-type autoclave to 110–120° C. and a total of 185 ml. of liquid SO₂ in small portions was so pumped in that the pressure in the vessel did not exceed 10 atm. gauge. The hydrogen iodide formed from the iodine while pumping in the SO₂ acts as catalyst. Shaking took place until the pressure was constant and, after cooling, the substance was suction-filtered. 230 g. of moist 1-aminonaphthalene-6-sulphonic acid were obtained.

Content determination: 13.2 g. of nitrite/100 g. of moist substance=32 g. total nitrite=74% of the theoretical.

Example 4

In a 160-litre enamelled stirrer-type autoclave, 8.6 litres of 50% NaOH and 35 g. of iodine were added to 112 kg. of a nitration mixture (35% of titratable sulphur acid, 3.5 kg. total nitrite, of which 75%=2.63 kg. of nitrite=15.75 kg. of 100% 1-nitronaphthalene-4,6,8-trisulphonic acid) while cooling and stirring. During the reaction, the iodine formed the hydrogen iodide necessary as catalyst. At a temperature of 115–120° C., a total of 9.7 kg. of SO₂ was pumped in, so that the pressure of the vessel did not rise above 10 atm. gauge, and then stirring took place until the pressure was constant. After completing the reaction, any SO₂ which was still present was extracted by boiling at normal pressure and, after cooling, the crystals were suction filtered off. There were obtained 25.4 kg. of moist 1-aminonaphthalene-4,6,8-trisulphonic acid, which was washed with 4 litres of aqueous, cold-saturated Na₂SO₄ solution.

Content determination: 8.8 g. nitrite/100 g. moist substance=2.23 kg. total nitrite=85% of the theoretical, calculated on the introduced 1-nitronaphthalene-4,6,8-trisulphonic acid.

Example 5

1500 ml. of a solution of 134 g. of nitrite=425 g. of

100% 2-nitrophenol-4-sulphonic acid with a sulphuric acid content of 18.5% were heated in a 3-litre enamelled shake-type autoclave to 120° C. Sulphur dioxide was then pumped in to a pressure of 10 atm. gauge and thereafter 1.2 g. of 57% hydriodic acid were pumped into the reaction vessel. The pressure was held at 10 atm. gauge by continuing to pump in sulphur dioxide, this proceeding until a total of 412 g. of sulphur dioxide had been pumped in. The autoclave was then shaken until the pressure was constant, the excess sulphur dioxide was driven off at 90° C. the autoclave was allowed to cool and 2-aminophenol-4-sulphonic acid precipitated in crystalline form was suction-filtered (yield: 335 g. of moist 2-aminophenol-4-sulphonic acid with 30 g. of nitrite/100 g.=75% of the theoretical.

The compound was homogeneous when examined by chromatography.

Example 6

A solution of 0.435 mol. of 6-nitro-2-naphthol-1,4-disulphonic acid in 600 ml. of 10% sulphuric acid was reduced in the presence of 2 g. of tin iodide in a 1.3-litre enamelled shaker-type autoclave at 115° C. with 87 g. of $SO_2$. The autoclave was shaken until no more $SO_2$ was taken up, and it was then allowed to cool and the precipitated 6-amino-2-naphthol-1,4-disulphonic acid was suction-filtered.

Yield: 131 g. of moist substance (=106 g. of 100% 6-amino-2-naphthol-1,4-disulphonic acid, corresponding to the analysis), this corresponding to a yield of 76% of the theoretical.

*Analysis.*—Nitrite value=17.5 g. of $NaNO_2$, consumption/100 g. of substance with diazotisation.

Example 7

A solution of 0.87 mol. of 6-nitro-4-hydroxy-1-methylbenzene-2-sulphonic acid in 1200 ml. of water, 5 ml. of 50% sulphuric acid and 4 g. of tin iodide were heated in a 3-litre enamelled shaker-type autoclave to 120° C. and 174 g. of sulphur dioxide were pumped in. Shaking took place until no further fall in pressure was observed, the autoclave was allowed to cool and the precipitated 6-amino-4-hydroxy-1-methylbenzene-2-sulphonic acid was suction-filtered.

Yield: 245 g.=71 g. 100% substance, i.e. 48% of the theoretical. The compound was homogeneous when examined by chromatography and was identical with 6-amino-4-hydroxy-1-methylbenzene-2-sulphonic acid.

*Analysis.*—Nitrite value=11.7 g. $Na.NO_2$ consumption/100 g. of substance in the diazotisation.

Example 8

845 g. of technical 4-chloro-2,6-dinitrophenol (=3.62 mol) i.e. 683 g. of 100% substance, 100 ml. of 70% acetic acid and 20 ml. of 50% sulphuric acid were heated in a 3-litre enamelled shaker-type autoclave to 125° C. 8 g. of 57% hydriodic acid were then pumped in and sulphur dioxide was forced in to a maximum pressure of 10 atm. gauge. The sulphur dioxide was absorbed and the pressure was constantly made up to 10 atm. gauge, until a total of 826 g. (12.9 mol) of sulphur dioxide had been pumped in.

6 litres of water were then added to the reaction mixture and clarification was effected with active carbon while hot. The filtrate was adjusted to a pH value of 3 with about 1.2 litres of concentrated sodium hydroxide solution. The 2-amino-4-chloro-6-nitrophenol precipitated in the form of red crystals and was suction-filtered after cooling.

Yield: 2077 g. of moist 2-amino-4-chloro-6-nitrophenol. The compound was homogeneous under chromatography and was identical with 2-amino-4-chloro-6-nitrophenol produced in other ways. By analysis, the yield corresponded to 485 g. of 100% substance, i.e. 71% of the theoretical.

In a manner similar to Example 8, 1,2-phenylenediamine was obtained from 2-nitroaniline at 130° C. and 2-aminophenol was obtained from 2-nitrophenol at 120° C. when 3.2 mols of sulphur dioxide were used per mol of nitro compound.

Example 9

8.975 kg. of a water-diluted mixture from the sulphiding of 2-nitrophenol, said mixture containing 28% of titratable sulphuric acid and 2.80 kg. (=12.77 mol) of 100% 2-nitrophenol-4-sulphonic acid, and 12.7 g. of lead iodide, were heated in a 16-litre enamelled stirrer-type vessel to 120° C. Sulphur dioxide was then pumped in until the pressure in the vessel was 10 atm. gauge. The commencement of the reduction was shown by a fall in pressure in the vessel. The reaction temperature was allowed to fall to 115° C. and more sulphur dioxide was slowly pumped in, so that a pressure of 8 to 10 atm. gauge was maintained in the vessel.

After absorption of 1.27 kg. of sulphur dioxide, 600 ml. of 25% ammoniacal water were added by pumping to the reaction mixture. A total of 2.54 kg. (=39.8 mols) of sulphur dioxide was used for the reduction. After the pressure was constant, the vessel was carefully aerated, excess sulphur dioxide was allowed to escape, the vessel was cooled to 20° C. and the 2-aminophenol-4-sulphonic acid which crystallised out was filtered off with suction. The filter residue was washed with 500 ml. of water and suction-filtered.

Yield: 2.99 kg. of moist 2-aminophenol-4-sulphonic acid in the form of colourless crystals=2.09 kg. of 100% substance (by analysis, 762 g. of nitrite)=11.05 mol i.e. 87% of the theoretical.

Example 10

In a 160-litre enamelled autoclave, 101 kg. of a 30% sulphuric acid solution of 6-chloro-2-nitrophenol-4-sulphonic acid with a content of 3.35 g. of nitrite in 100 g. (=3.38 kg. total nitrite) of 6 chloro-2-nitrophenol-4-sulphonic acid and 65 g. of iodine were heated to 125–130° C. The quantity of 10.25 kg. of liquid sulphur dioxide which was necessary for the production was pumped in at a rate such that the internal pressure of the vessel did not rise above 10 atm. gauge. After all the sulphur dioxide had been pumped in, the vessel was stirred at the indicated reaction temperature until the pressure was constant, whereupon it was cooled to 110° C., carefully aerated, the reaction mixture was cooled to 25° C. suction-filtered and the crystallisate is washed with 5 litres of 20% sulphuric acid. There were obtained 16.5 kg. of 56% 6-chloro-2-aminophenol-4-sulphonic acid in the form of light grey and almost colourless crystals.

*Analysis.*—17.3 g. of nitrite/100 g.=2.86 kg. total nitrite.

Yield: 9.23 kg. of 100% substance=84.5% of the theoretical.

Example 11

In a 160-litre enamelled autoclave, 98.5 kg. of a 32% sulphuric acid solution of 4-chloro-2-nitrophenol-6-sulphonic acid with a content of 3.66 g. of nitrite in 100 g. (=3.6 kg. total nitrite) of 4-chloro-2-nitrophenol-6-sulphonic acid and 60 g. of iodine were heated to 130 to 132° C. 10.2 kg. of liquid sulphus dioxide were pumped into this mixture at a rate such that the pressure in the vessel did not exceed 10 atm. gauge. When all the sulphur dioxide had been pumped in, stirring took place until the pressure was constant, the vessel was thereafter cooled to 110 to 115° C. and carefully aerated and, after cooling to 25° C., the substance was suction-filtered. The crystallisate was washed with 4 litres of 20% sulphuric acid. There were obtained 17.5 kg. of 60% 4-chloro-2-aminophenol-6-sulphonic acid in the form of colourless crystals.

Content determination: 18.5 g. nitrite/100 g.=3.24 kg. total nitrite.

Yield: 10.45 kg. of 100% substance=90% of the theoretical.

Example 12

1 kg. of the technical nitrating mixture of naphthalene-1-sulphonic acid, consisting of: 1-nitronaphthaline-5-sulphonic acid, 1-nitronaphthalene-8-sulphonic acid, small quantities of other isomers, sulphuric acid and some nitric acid, was diluted with 1 litre of water and 200 ml. of 25% ammoniacal water. According to analysis, the dilute contained 117.5 g. of nitrite (=1.7 mol.) of nitro compounds, and 12% of titratable sulphuric acid. This mixture was heated in a 3-litre enamelled shaker-type autoclave to 110° C., sulphur dioxide was pumped in until the pressure is 10 atm. gauge and then a solution of 28.9 g. of 57% hydriodic acid in 50 ml. of water was also pumped in. The sulphur dioxide consumed by the reduction was constantly replenished by pumping until the autoclave pressure was 10 atm. gauge, and until a total of 339 g. of sulphur dioxide was consumed. After the pressure was constant, the autoclave was cooled to room temperature and the crystallisate was filtered off with suction.

Yield: 1.194 g. of moist reaction product.

*Analysis.*—Nitrite value: 6.9 g. of sodium nitrite consumption 100 g. in the diazotisation, which corresponds to 82.5 g. of nitrite and 1.19 mol of amino compounds, =70% of the theoretical.

Using analysis by paper chromatography, the mixture of the amino compounds was established as consisting of:

| | Mol percent |
|---|---|
| 1-aminonaphthalene-5-sulphonic acid | 20 |
| 1-aminonaphthalene-8-sulphonic acid | 60 |
| 1-aminonaphthalene-6-sulphonic acid | 5 |
| 1-aminonaphthalene-7-sulphonic acid | 5 |

The residue consisted of small quantities of other impurities. The mixture could be separated by known processes.

Example 13

148 g. (=18 g. of nitrite) of 1-nitronaphthalene-3,6,8-trisulphonic acid (content: 12.15 g. of nitrite/100 g. of substance) were heated with 466 ml. of water, 86 g. of concentrated sulphuric acid and 3 g. of powdered copper in 1.3-litre enameled shaker-type autoclave to 120° C. 128 g. of sulphur dioxide were pumped in and thereafter a solution of 5.4 g. of copper sulphate in 45 ml. of water was added. The temperature was kept for about 10 hours at 120° C. until the sulphur dioxide was absorbed. After adding 100 ml. of water, the reaction mixture was filtered at 90–100° C., 300 g. of 20% potassium chloride solution were added, the substance was cooled and the precipitated 1-amino-naphthalene-3,6,8-trisulphonic acid was filtered off with suction.

Yield: 178 g. of colourless crystals.

*Analysis.*—8.61 g. of nitrite/100 g. of substance, i.e. 85% of the theoretical.

The compound was pure according to chromatographic analysis.

Example 14

In a manner similar to Example 13, 1-nitronaphthalene-3,6,8-trisulphonic acid was reduced with sulphur dioxide, but in the presence of other catalysts.

The molar quantities of catalysts correspond to Example 1 and the results are set out in the table.

| Metal | Metal salt | Yield (percent of theoretical) |
|---|---|---|
| Cu | | 88 |
| | CuSO$_4$ | 85 |
| Pd | FeSO$_4$ | 57 |
| Pd | CuSO$_4$ | 85 |
| Pd | SnCl$_2$ | 45 |
| Cu | FeSO$_4$ | 78 |
| Manganin (Cu Mn Ni) | FeSO$_4$ | 86 |
| Constantan (Cu, Ni) | FeSO$_4$ | 60 |
| Nickel silver (Cu Ni Zn) | FeSO$_4$ | 70 |
| Cu | MnSO$_4$ | 72 |
| Pd | TiCl$_3$ | 57 |
| Pd | NaVO$_3$.H$_2$O | 41 |
| Pd | Cr$_2$(SO$_4$)$_3$ | 67 |

Example 15.—1-aminonaphthalene-3,6,8-trisulphonic acid 2.44 kg. of nitration mixture (25% of titratable sulphur acid containing 32 g. of nitrite =200 g. of 1-nitronaphthalene-3,6,8-trisulphonic acid) and 2.5 g. of copper powder were heated in a 3-litre lead shaker-type autoclave to 120° C. and 20 ml. of SO$_2$ were forced in under pressure, so that a pressure of 10 atm. gauge SO$_2$ was obtained. 20 ml. of CuSO$_4$ solution ($\triangleq$ 1 g. CuSO$_4 \times$ 5 H$_2$O $\triangleq$ 0.14 g. Cu$^{++}$)

were then pumped in. While keeping the SO$_2$ pressure at 10 atm. gauge, another 235 ml. of SO$_2$ were added in small portions by pumping and shaking took place until the pressure was constant. The reaction was completed after 8 to 10 hours. At 100° C. clarification was effected by way of a heatable pressure filter and 120 g. of NaCl were stirred into the filtrate. After cooling to 20° C., the substance was sharply suction-filtered and the crystallisate was washed with 100 ml. of cold saturated NaCl solution.

Yield: 308 g. of moist 1-aminonaphthalene-3,6,8-trisulphonic acid. Content determination: 8.4 g. of nitrite/100 g. of moist substance=36 g. of total nitrite=81% of the theoretical, calculated on the 1-nitronaphthalene-3,6,8-trisulphonic acid which was introduced).

The 1-aminonaphthalene-3,6,8-trisulphonic acid which was obtained was homogenous when examined by chromatography.

Example 16.—1-aminonaphthalene-3,6,8-trisulphonic acid 2.44 kg. of nitration mixture (35% of titratable acid, containing 32 g. of nitrite=200 g. of 1-nitronaphthalene-3,6,8-trisulphonic acid) and 2 g. of manganin were heated in a 3-litre lead shaker-type autoclave to 120° C. and 20 ml. of SO$_2$ were forced in under pressure, so that there was an SO$_2$ pressure of 10 atm. gauge. An aqueous solution of 20 ml. of FeCl$_2$ ($\triangleq$ 2 g. FeCl$_2 \times$ 6 H$_2$O $\triangleq$ 0.7 g. Fe$^{++}$)

was then pumped in. While maintaining an SO$_2$ superatmospheric pressure of 10 atm. gauge, another 235 ml. of SO$_2$ were introduced in small portions by pumping and the autoclave was shaken until the pressure was constant. The reaction was completed after 10 to 12 hours. After cooling to 100° C., clarification was effected by way of a heatable pressure filter and 182 g. of Na$_2$SO$_4$ were dissolved in the hot filtrate. After cooling to 20° C., the substance was suction-filtered and the moist filter material was washed with 100 ml. of cold saturated Na$_2$SO$_4$ solution.

Yield: 290 g. of moist-1-aminonaphthalene-3,6,8-trisulphonic acid. Content determination: 8.3 g. of nitrite/100 g. of moist material=24.05 g. of total nitrite=75.2% of the theoretical, based on the 1-nitronaphthalene-3,6,8-trisulphonic acid introduced.

The 1-aminonaphthalene-3,6,8-trisulphonic acid which was obtained was homogeneous when examined by chromatography.

Example 17.—1-aminonaphthalene-6-sulphonic acid 185 g. of 1-nitronaphthalene-6-sulphonic acid (87.4% = 41 g. of nitrite) and 750 ml. of 15% H$_2$SO$_4$ were heated in a 2-litre lead stirrer-type autoclave to 120° C., 185 ml. of liquid SO$_2$ were introduced under pressure and thereafter 10 ml. of FeCl$_2$ solution ($\triangleq$ 1 g. FeCl$_2 \times$ 6 H$_2$O $\triangleq$ 0.35 g. Fe$^{++}$)

were pumped in. Stirring took place for about 8 to 10 hours until pressure was constant. After cooling, the contents of the autoclave were suction-filtered and the filter residue was washed with 20% HCl. 248 g. of moist 1-aminonaphthalene-6-sulphonic acid were obtained. Content determination: 13.95 g. of nitrite/100 g. of moist substance =34.6 g. of total nitrite=85% of the theoretical, calculated on 1-nitronaphthalene-6-sulphonic acid introduced.

The 1-aminonaphthalene-6-sulphonic acid which is obtained was homogeneous when examined by chromatography.

Example 18

72.6 g. (=0.29 mol) of 1-nitrobenzene-3-sulphonic acid, (corresponding to 20 g. of nitrite), dissolved in 553 g. of 15% sulphuric acid, were heated in a 1.3-litre shaker-type autoclave which was lined with lead to 160° C.

10 g. of sulphur dioxide were then forced into the autoclave and thereafter a solution of 6 g. of iron sulphate (FeSo$_4$·7H$_2$O) in 20 ml. of water was pumped into the autoclave. Another 118 g. of sulphur dioxide was pumped in small portions into the autoclave, so that the pressure did not rise above 10 atm. gauge. The autoclave was shaken until the pressure was constant, 19 g. of sodium sulphate were added at 90° C. to the reaction mixture, which was allowed to cool. After suction filtering, there were obtained 81 g. of 3-aminobenzene sulphonic acid as a moist substance with a nitrite content of 20.0 g. of nitrite/100 g. of substance. This corresponded to a yield of 81% of the theoretical.

Example 19

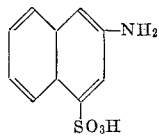

800 g. (=0.87 mol, corresponding to 60 g. of nitrite) of magnesium-2-nitronaphthalene-4,8-disulphonate [technical substance (7.5 g. of nitrite/100 g. of substance)] were heated with 1 litre of water, 5 ml. of 50% sulphuric acid, 5 g. of iron sulphate and 5 g. of the refined steel alloy V$_4$A (in small chips) in a 3-litre enamelled shaker-type autoclave to 140° C. 217 g. (=3.4 mol) of sulphur dioxide were pumped in and thereafter a solution of 6 g. of iron sulphate in 20 ml. of water was added and the autoclave was shaken until the pressure was constant. 400 g. of sodium chloride were then added at 90° C. to the reaction mixture, the excess sulphur dioxide was extracted by boiling, the mixture was allowed to cool, and was suction filtered and washed with 200 ml. of 20% common salt solution.

Yield: 677 g. (nitrite value 6.9 g. of nitrite/100 g.), corresponding to a yield of 78% of the theoretical.

Example 20.—6-amino-2-naphthol-1,4-disulphonic acid 100 g. of 6-nitro-2-naphthol-1,4-disulphonic acid=15.2 g. of nitrite, 1 g. of copper-bronze and 1 g. of $$CuSo_4 \times 5H_2O$$

were heated in a pressure vessel in 100 ml. of 10% sulphuric acid to 100° C. 225 g. of a 40% sodium hydrogen sulphite solution=80.4 g. of NaHSO$_3$=61.0 g. of nitrite SO$_2$ were pumped into the hot suspension over a period of 30 minutes. The mixture was stirred for 2 hours at 100° C. and thereafter filtered while hot. After adding 150 ml. of 37% hydrochloric acid, the excess SO$_2$ was extracted from the filtrate by boiling over a period of 1 hour, and after cooling, the crystal magma was suction-filtered and washed with 100 ml. of cold 10% hydrochloric acid.

Yield: 183 g. of greyish-white crystals of 6-amino-2-naphthol-1,4-disulphonic acid.

*Analysis:*—6.5 g. of nitrite/100 g.=11.9 g. total nitrite=78% of the theoretical.

The substance obtained was homogeneous when examined by chromatography.

Example 21

In a manner similar to Example 8 5-amino-quinoline is obtained from 5-nitroquinoline.

When using nitromethane as starting material methylamine is obtained. The isolation of methylamine is accomplished in the usual manner by distillation after having adjusted the filtrate to a pH-value of about 12.

We claim:

1. A process for the production of primary amino compounds which comprises reducing the corresponding nitro or dinitro compounds in sulphuric acid medium with sulphur dioxide in the presence of a catalyst for said reduction at temperatures between +30 and +250° C.

2. The process of claim 1 wherein the reducing agent is used in the form of an aqueous solution of sulphur dioxide.

3. The process of claim 1 wherein the reducing agent is used in the form of a neutral or acid salt of sulphurous acid.

4. The process of claim 1 wherein the reduction is carried out in the presence of a catalyst selected from the group consisting of hydriodic acid and compounds which form hydriodic acid.

5. The process of claim 1 wherein the catalyst is a salt of a metal of the IVth period and 1st, 2nd, 4th, 5th, 6th and 8th groups of the Mendeleef Periodic System.

6. The process of claim 1 wherein the sulfuric acid medium has an acid concentration of from 0.5 to 70 percent by weight.

7. A process for the production of primary amino compounds comprising reducing the corresponding nitro compounds with SO$_2$, said nitro compounds containing either one or two nitro substituents and being selected from the group consisting of aliphatic nitro compounds having up to 20 carbon atoms, cycloaliphatic nitro compounds having from 5 to 6 carbon atoms, heterocyclic nitro compounds having a 6 membered hetero ring one member of which is nitrogen, heterocyclic nitro compounds having a 6 membered hetero ring one member of which is nitrogen and having a benzene ring system fused to the hetero ring, aromatic nitro compounds and substituted products of said nitro compounds wherein the substituents are selected from the group consisting of halogen, hydroxyl, carboxyl, alkoxy having up to three carbon atoms, sulphonic acid, mercapto, alkyl mercapto having up to 3 carbon atoms, amino, mono or di alkyl substituted amino having up to 3 carbon atoms in each alkyl group, sulphonamido, mono or dialkylsulphonamido having up to 3 carbon atoms in each alkyl group, alkyl having up to 10 carbon atoms, phenyl, naphthyl, alkyl substituted phenyl having up to 3 carbon atoms in the alkyl group and alkyl substituted naphthyl having up to 3 carbon atoms in the alkyl group, said reduction being conducted at 30–250° C. in sulfuric acid of 0.5–70% strength and in the presence of a catalyst selected from the group consisting of iodine, hydriodic acid, compounds which form hydriodic acid under the reaction conditions, a salt of a metal of the IVth period and 1st, 2nd, 4th, 5th, 6th or 8th group of the Mendeleeff Periodic System, and recovering the amino compound formed in the reaction mixture.

8. The process of claim 7 wherein the catalyst is hydriodic acid, a compound which forms hydriodic acid under the reaction conditions, or mixtures thereof.

9. A process for the production of an aromatic amino compound comprising reducing a corresponding aromatic nitro compound containing either one or two nitro substituents in a sulphuric acid medium having an acid concentration of between 0.5 and 70 percent by weight in the presence of hydriodic acid at a temperature of between 30 and 250° C., using sulfur dioxide as a reducing agent.

10. The process of claim 9 wherein the aromatic nitro compound is selected from the group consisting of benzene, naphthalene, anthracene and substituted products of said aromatic nitro compounds wherein the substituents are selected from the group consisting of halogen, hydroxyl, carboxyl, alkoxy having up to three carbon atoms, sulphonic acid, mercapto, alkylmercapto having up to 3 carbon atoms, amino, mono or di alkyl substituted amino having up to 3 carbon atoms in each alkyl group, sulphonamido, mono or dialkylsulphonamido having up to 3 carbon atoms in each alkyl group, alkyl having up to 10 carbon atoms, phenyl, naphthyl, alkyl substituted phenyl having up to 3 carbon atoms in the alkyl group and alkyl substituted naphthyl having up to 3 carbon atoms in the alkyl group.

References Cited

UNITED STATES PATENTS

| | | | |
|---|---|---|---|
| 1,499,761 | 7/1924 | Bissell | 260—580 |
| 1,998,541 | 4/1935 | Haberland | 260—580 X |
| 2,510,281 | 6/1950 | Gold | 260—689 X |
| 2,765,301 | 10/1956 | Cashion | 260—580 X |
| 3,073,865 | 1/1963 | Spiegler | 260—508 X |
| 3,223,727 | 12/1965 | Stryker | 260—508 X |

NICHOLAS S. RIZZO, *Primary Examiner.*

D. G. DAUS, *Assistant Examiner.*

U.S. Cl. X.R.

260—580, 689, 644, 645, 508, 514, 283, 290, 646, 609, 296, 567.6, 583, 518, 556, 397.6; 252—437, 434, 441